Jan. 23, 1968    C. VAN DER LELY ET AL    3,365,103
IMPLEMENTS FOR SPREADING POWDERED OR GRANULAR
MATERIALS OVER THE GROUND
Original Filed Dec. 13, 1962    5 Sheets-Sheet 1

INVENTORS
CORNELIS & ARY VAN DER LELY
BY
Mason, Mason & Albright
Attorneys

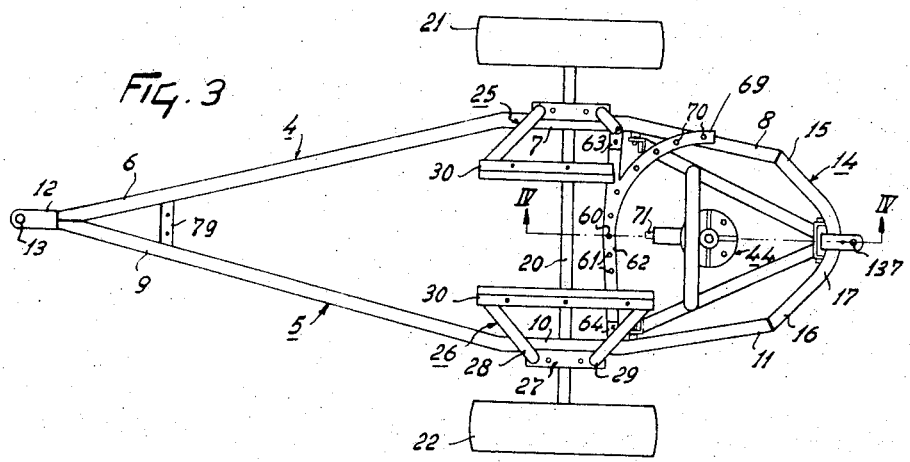
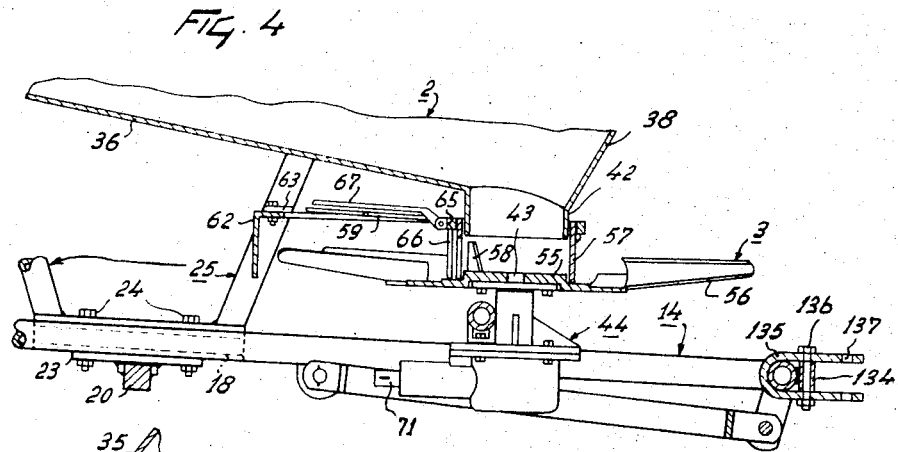
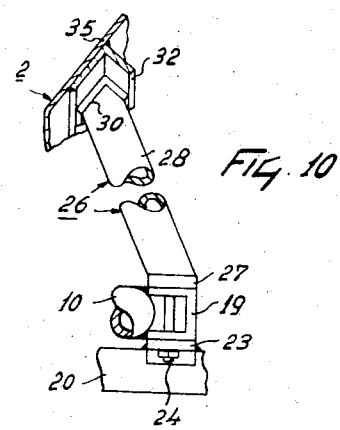

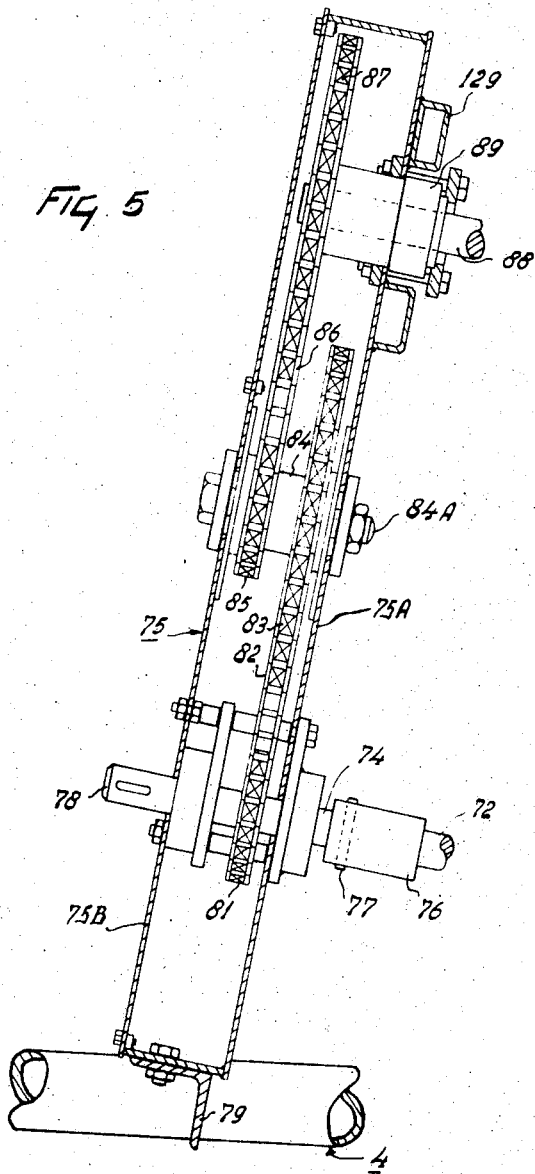

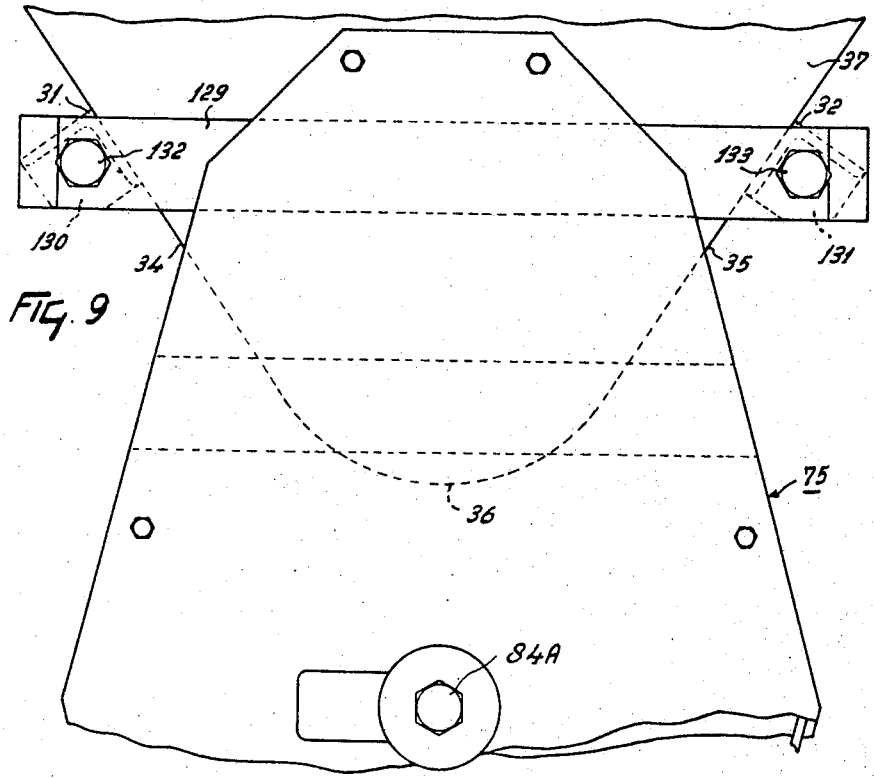
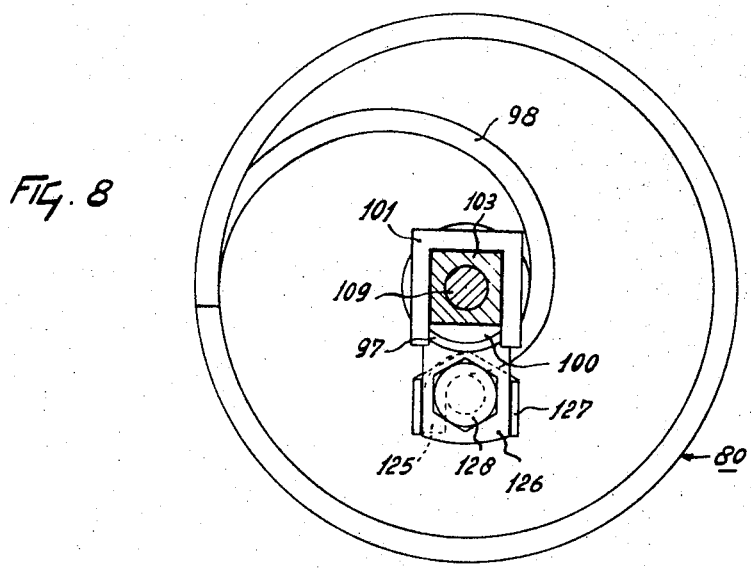

United States Patent Office 3,365,103
Patented Jan. 23, 1968

3,365,103
IMPLEMENTS FOR SPREADING POWDERED OR GRANULAR MATERIALS OVER THE GROUND
Cornelis van der Lely, Zug, Switzerland, and Ary van der Lely, Maasland, Netherlands, assignors to C. van der Lely N.V., Maasland, Netherlands, a Dutch limited-liability company
Original application Dec. 13, 1962, Ser. No. 244,313, now Patent No. 3,218,083, dated Nov. 16, 1965. Divided and this application Nov. 12, 1965, Ser. No. 507,482
8 Claims. (Cl. 222—176)

This application is a division of application Ser. No. 244,313, filed Dec. 13, 1962 (now Patent No. 3,218,083, dated Nov. 16, 1965), which application discloses an implement for spreading powdered or granular materials over the ground. The implement comprises a frame movable over the ground, a hopper adapted to contain material to be spread, a spreader located adjacent an outlet of the hopper. In particular, the present invention is concerned with an agitator designed to extend along the bottom of the hopper. The agitator is preferably one or more helical members arranged so that its longitudinal axis will move the powdered materials to an outlet in the hopper.

In application Ser. No. 244,313 the agitator, comprising helical members, has its longitudinal axis substantially parallel to the longitudinal axis of the bottom of the hopper. The helical members are flexible relative to the driving shaft so that the amount of material urged to the outlet is varied depending on the consistency or resistance of the material to be spread.

It is an object of the present invention to provide a helical member in the hopper of a spreader implement which member will vary the amount of material supplied to the hopper outlet depending on the resistance encountered by the member.

The foregoing and other objects will be apparent from the following:

Figure 1:
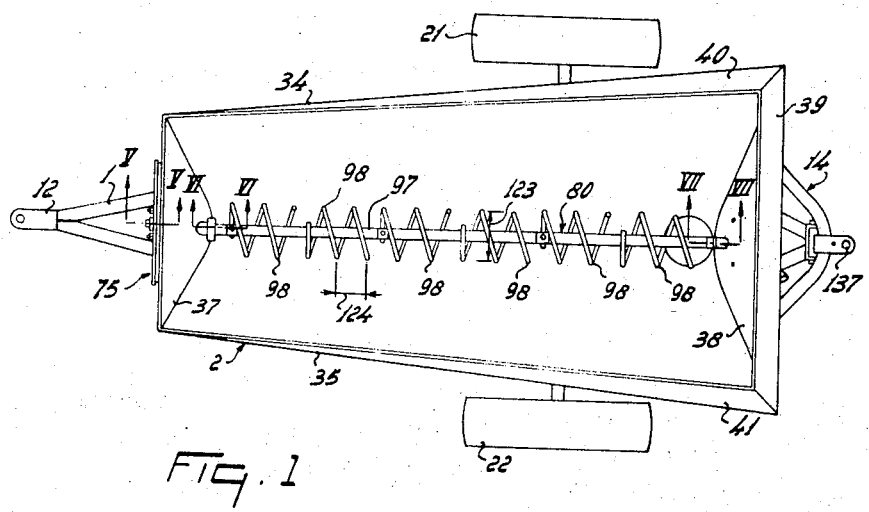
FIGURE 1 is a top plan view of the implement according to the invention.
Figure 2:
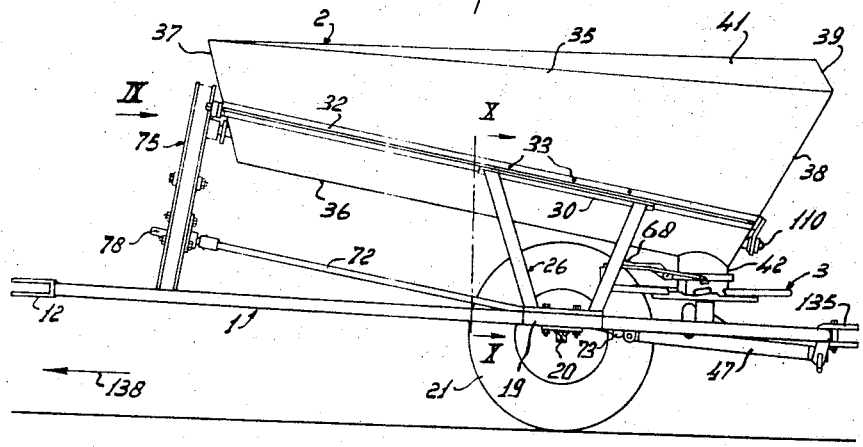
FIGURE 2 is a side elevation of an implement.
Figure 6:
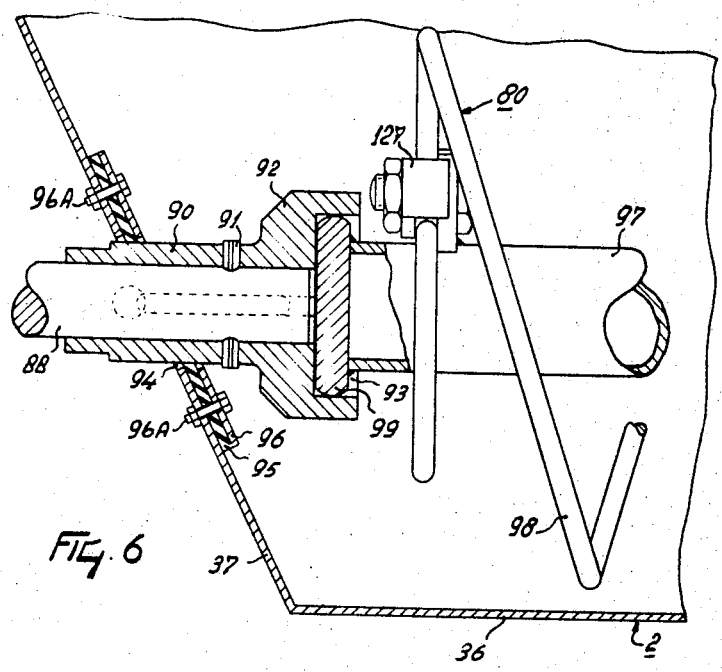
Figure 7:
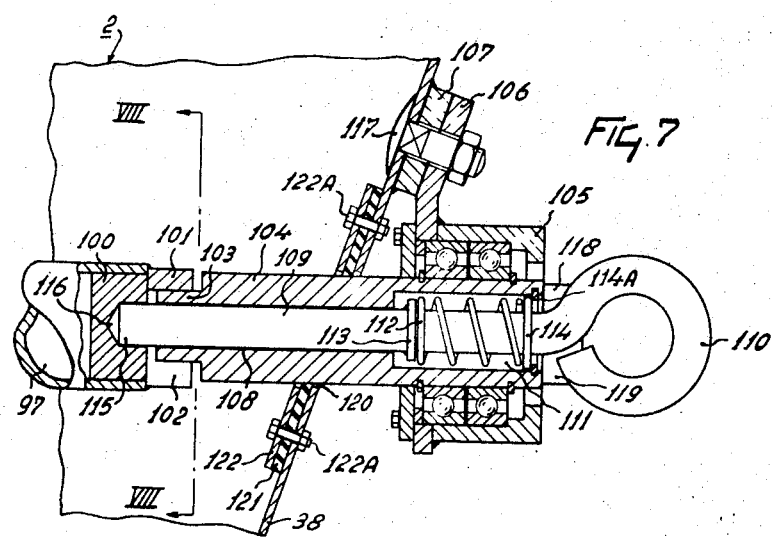

FIGURE 3 corresponds to FIGURE 1 but shows the implement with certain parts thereof removed, FIGURE 4 is a section, to an enlarged scale, taken on the line IV—IV of FIGURE 3, FIGURE 5 is a section, to an enlarged scale, taken on the line V—V of FIGURE 2, FIGURE 6 is a section, to an enlarged scale, taken on the line VI—VI of FIGURE 2, FIGURE 7 is a section, to an enlarged scale, taken on the line VII—VII of FIGURE 2, FIGURE 8 is a section, taken on the line VIII—VIII of FIGURE 7, FIGURE 9 is a view, to an enlarged scale, as seen in the direction indicated by the arrow IX of FIGURE 1, FIGURE 10 is a section, to an enlarged scale, taken on the line X—X of FIGURE 1.

Referring to the drawings, the implement has a frame which is generally indicated by the reference numeral 1 and upon which a hopper, generally indicated by the reference numeral 2, is mounted. The hopper 2 is adapted to contain a quantity of powdered or granular material, such, for example, as artificial fertiliser, which is to be spread over the ground. A spreading member generally indicated by the reference numeral 3 is located beneath the hopper 2 and towards the rear end thereof with respect to the intended direction of travel 138 (FIGURE 1) of the implement. The frame 1 includes two main frame beams 4 and 5 (FIGURE 3) which are of symmetrically identical construction. The beam 4 has three portions 6, 7 and 8 and the beam 5 three portions 9, 10 and 11.

The portions 6 and 9 converge forwardly of the implement and the portions 8 and 11 converge rearwardly of the implement whereas the portions 7 and 10 extend parallel to one another. The leading ends of the portions 6 and 9 are secured to one another by a forked bracket 12 whose horizontally disposed limbs are formed with vertically aligned holes 13. The rearmost ends of the portions 8 and 11 are interconnected by a beam 14 which comprises two straight portions 15 and 16 integrally interconnected by a gently curved portion 17. As can be seen in FIGURE 3, the beam 14 has approximately the shape of a rounded V when seen in plan.

Relatively short beams 18 and 19 of channel-shaped cross-section are fastened to the two portions 7 and 10 of the beams 4 and 5 respectively (see FIGURES 2, 4 and 10), the non-rotatable axle 20 of two ground wheels 21 and 22 being connected to these beams. The axle 20 has two flat strips 23 welded or otherwise secured to it, these strips being fastened to the lowermost sides of the beams 18 and 19 respectively with the aid of bolts 24 (see FIGURES 4 and 10). Hopper supports 25 and 26 of symmetrically identical construction are also fastened to the beams 18 and 19 and in view of the identical construction, only the support 26 will be described in detail. The support 26 comprises a horizontally disposed strip 27 which is fastened to the uppermost side of the beam 19 with the aid of the same bolts 24 as are used to secure one of the strips 23 to the lowermost side of that beam. Two beams 28 and 29 project upwardly in divergent relationship from opposite ends of the strip 27 and are interconnected at their uppermost ends by a strip 30 of L-shaped cross-section. The hopper 2 rests on the strips 30 of the supports 25 and 26 and, to this end, has strips 32 and 33 (see FIGURES 2, 9 and 10) fastened to its opposite sides with the aid of bolts 33. It will be apparent from FIGURE 10 of the drawings that, when the hopper 2 is in position on the implement, the limbs of the strips 30 fit between the limbs of the strips 31 and 32 respectively.

The hopper 2 has opposite side surfaces 34 and 35 whose lowermost edges are interconnected by an approximately cylindrical curved bottom 36 (see FIGURE 9), the surfaces 34 and 35 are diverging relative to each other from their lower sides to their uppersides. The leading edges of the surfaces 34 and 35 are interconnected by a front plate 37 and the rearmost edges are similarly interconnected by a rear plate 38. The width of the plate 37 is less than the width of the plate 38 so that, as will be evident from FIGURE 2, the hopper 2 decreases gently in width from its rear end to its front end. Moreover, as is evident from FIGURE 2, the bottom 36 of the hopper 2 slopes downwardly from the front to the rear thereof whereas the uppermost edge of the hopper is approximately horizontally disposed. The front plate 37 is extending obliquely downwardly and rearwardly, whereas the rear plate 38 is extending obliquely downwardly and forwardly. The uppermost edges of the rear plate 38 is provided with a rim 39 which is bent over inwardly of the hopper. Similar rims 40 and 41 are provided along the uppermost edges of the side surfaces 34 and 35 respectively but these rims taper towards the front of the hopper in such a way that they merge with the respective side surfaces 34 and 35 at the points where the uppermost edges of these surfaces meet the uppermost edge of the plate 37.

A hole is formed in the bottom 36 of the hopper 2 at the lowermost end thereof and a cylindrical outlet nozzle 42 projects downwardly from the said hole. The spreading member 3 (FIGURE 4) is arranged beneath the nozzle 42 and is mounted on the uppermost end of a substantially vertical shaft 43 that is journalled in a gear casing 44.

The gear casing 44 contains two meshing bevel gears (not visible in the drawings) one of which is fastened to the shaft 43 and the other of which is fastened to an input shaft 71 which is approximately horizontally disposed and whose leading splined or otherwise keyed end projects forwardly of the implement from the gear casing. The spreading member 3 itself comprises a central disc 55 which is bolted to a plate carried by the shaft 43 and six curved spreading arms 56 which are equally spaced around the circumference of the disc 55. As can be seen in FIGURE 4, the disc 55 is spaced below the outlet nozzle 42, an annulus 57 which surrounds the lowermost end of the said nozzle bearing against the disc 55 around a central raised portion of that disc which prevents substantial lateral movements of the annulus 57 relative thereto. The annulus 57 is provided with outlet ports 58 through which the powdered or granular material contained in the hopper 2 can reach the spreading member 3. The annulus 57 is prevented from turning with the disc 55 when the spreading member 3 is in use by means of an arm 59 which projects approximately radially from the annulus and whose free end is provided with a downwardly directed pin 60 (FIGURE 3) that can be entered in any one of a number of holes 61 formed in a strip 62 to fix the annulus 57 in a corresponding angular setting about the axis of rotation of the spreading member 3. The strip 62 is of L-shaped cross-section and has its opposite ends bolted to lugs 63 and 64 projecting from the beams 29 of the hopper supports 25 and 26 respectively. The strip 62 has a curved extension 69 which is formed with a number of further holes 70 into any one of which the pin 60 can be entered.

The annulus 57 is surrounded by a ring 65 which bears upon lugs projecting from the said annulus, the ring 65 carrying a number of masking plates 66 each of which is arranged to co-operate with a corresponding one of the outlet ports 58. An arm 67 projects approximately radially of the ring 65 and its free end is provided with a clamp 68 (FIGURE 2) which is not shown in detail but which can be employed to releasably secure the arm 67 to the strip 62 or to its extension 69 so that the masking plates 66 will occupy corresponding angular settings about the axis of rotation of the shaft 43. It will be apparent that, in dependence upon ther elative angular settings of the outlet ports 58 and masking plates 66 about the said axis of rotation, the outlet ports 58 will be open to a greater or lesser extent.

The input shaft 71 of the gear casing 44 is connected to one end of a transmission shaft 72 by a universal joint 73 (FIGURE 2) of the "Hooke" type. The opposite end of the transmission shaft 72 is connected to a shaft 74 (FIGURE 5) which affords the output shaft of a transmission casing 75 (FIGURES 2 and 5). The casing 75 comprising a supporting member 75A and a closing plate 75B. The connection between the shafts 72 and 74 is afforded by a sleeve 76 which is rigidly secured to the end of the shaft 72 and into the open end of which the shaft 74 is entered. A small transverse pin 77 is entered through matching holes formed in the shaft 74 and in the wall of the sleeve 76. The lowermost end of the transmission casing 75 is bolted to a beam 79 of L-shaped cross-section which beam, as can be seen in FIGURE 3, interconnects the portions 6 and 9 of the main frame beams 4 and 5 adjacent the forked bracket 12.

The transmission casing 75 contains transmission members that are arranged to drive an agtitator which is generally indicated by reference nummeral 80 (FIGURE 1). The agitator 80 is disposed internally of the hopper 2 and extends between the plates 37 and 38 immediately above the bottom 36. The output shaft 74 of the transmission casing 75 has a splined or keyed end 78 which projects forwardly of the said casing and affords the input shaft thereof. The input and output shafts of the transmission casing 75 are thus integral, the input shaft afforded by the end 78 being intended to be connected to the power take-off shaft of a tractor or other propelling vehicle by means of an independent transmission shaft provided with suitable universal joints. The shaft 74 carries a sprocket 81 which is linked by an endless chain 82 to a further larger sprocket 83 mounted on a sleeve 84 which is turnable about a bolt 84A extending between the walls of the casing 75 approximately centrally thereof. A further smaller sprocket 85 is secured to the sleeve 84 alongside the sprocket 83 and is connected by an endless chain 86 to a further larger sprockekt 87 fastened to the end of a shaft 88 which is journalled in a bearing 89 secured to one of the walls of the transmission casing 75 towards the upper end thereof. The shaft 88 extends between the transmission casing 75 and the inner side of the front plate 37 of the hopper 2. The end of the shaft 88 located within the hopper 2 has a coupling member 90 secured to it with the aid of a transverse pin 91 (see FIGURE 6). The coupling member 90 has a cup-shaped head 92 which is formed with a square recess 93 whose centre coincides with the longitudinal axis of the shaft 88. The shaft 88 and the surrounding coupling member 90 are entered through a hole 94 formed in the front plate 37 of the hopper 2, the edges of the hole 94 being sealed by means of a rubber or other flexible washer 95 clamped to the inner side of the plate 37 with the aid of an annular plate 96 and a series of small bolts 96A.

The agitator 80 is comprised by a tube 97 (FIGURES 1 and 6 to 8) to which tube six helical springs 98 are fastened. The end of the tube 97 which faces the shaft 88 has a square recess 93 of the head 92 in such a way that relative rotation between the tube 97 and the shaft 88 is prevented. The opposite end of the tube 97 which is disposed adjacent the rear plate 38 of the hopper 2 has a blind ring 100 secured internally thereof, the said 100 carrying a three-sided coupling member 101 (FIGURES 7 and 8) whose three sides define a recess 102 that is open in the direction of the fourth and missing side of the coupling member 101. A square projection 103 formed at one end of a hollow shaft 104 is entered in the recess 102 and is engaged by the sides of the coupling member 101 in such a way as to prevent relative rotation therebetween. The end of the shaft 104 remote from the square projection 103 is rotatably journalled in a ball bearing 105. The body of the ball bearing 105 incorporates an apertured lug 106 which is fastened by bolts 117 to a strip 107 which is itself secured to the rear plate 38 of the hopper 2 at the same level as the rearmost ends of the strips 31 and 32.

The hollow interior 108 of the shaft 104 accommodates a pin 109 which is provided at its rearmost end with a handle in the form of an eye 110. A portion of the shank of the pin 109 which adjoins the eye 110 is located within a recess 111 formed internally of the shaft 104 and of greater diameter than the coaxial hollow interior or bore 108. The recess 111 accommodates a helical spring 112 which is wound round the said portion of the shank of the pin 109 and which bears between a collar 113 fixed to the shank of the pin 109 and a washer 114 which surrounds the shank but is not secured thereto. As can be seen in FIGURE 7, the washer 114 itself bears against a resilient washer or the like 114A whose radially outermost edge is entered in a groove formed just inside the mouth of the recess 111. It will be apparent that the spring 111 acts to urge the tip 115 of the pin 109 into engagement with the blind hole 116 of the ring 100. The end of the hollow shaft 104 remote from the tube 97 has two diametrically opposed slots 118 and 119 cut in its cylindrical wall, these slots accommodating portions of the eye 110 when the pin 109 occupies the position shown in FIGURE 7. It will be apparent that this position is such that the eye 110 is located sufficiently clear of the ball bearing 105 to enable it to be readily accessible. The shaft 104 is entered through a hole 120 formed in the rear plate 38 of the hopper, this hole being sealed with the aid of members 121, 122 and 122A which are substantially identical to the members 95, 96 and 96A that have previously been described.

The six helical springs 98 which surround the tube 97 are made of spring steel and have only those ends thereof which are remote from the nozzle 42 secured to the said tube. Each spring 98 has a diameter 123 (FIGURE 1) which is approximately one-and-a-half times the pitch 124 of a single turn of the spring. Each spring has approximately two-and-a-half turns and the mounting thereof is such that the free end can move along the bottom 36 of the hopper 2 in a direction substantially parallel to the longitudinal axis of the tube 97. The end 125 (FIGURE 8) of each spring 98 which is remote from the nozzle 42 is clamped between a plate 126 fastened to the tube 97 and a further separate plate 127 by a bolt 128. Each of the springs 98 extends over approximately one-sixth of the length of the bottom 36 of the hopper 2 and each spring, with the exception of the rearmost one, has its free end located adjacent the fixed end of a neighbouring spring.

The rear side of the transmission casing 75 has a horizontal bar 129 (FIGURES 5 and 9) secured to it whilst the leading ends of the two strips 31 and 32 have transverse plates 130 and 131 respectively fastened to them. Registering holes are formed in the opposite ends of the bar 129 and in the plates 130 and 131 and bolts 132 and 133 respectively are entered through these holes to secure the front end of the hopper 2 to the transmission casing 75. The curved portion 17 of the beam 14 has a vertical sleeve 134 (FIGURE 4) secured to its rearmost side. A U-shaped bracket 135 is arranged around the beam 14 and is fixed in position by a bolt 136 entered through holes formed in its limbs and through the sleeve 134. The free ends of the limbs of the bracket 135 are formed with a pair of vertically aligned holes 137 through which a locking pin can be entered to connect the draw-bar of a cart or the like to the rear of the implement. The cart may, for example, be used to transport a bulk supply of powdered or granular material intended to be placed in the hopper 2.

In the use of the implement, the forked bracket 12 is connected to the tow-bar or the like of a tractor or other propelling vehicle whilst the input shaft 78 of the transmission casing 75 is connected by an independent transmission shaft to the power take-off shaft of the tractor or other vehicle. The implement can then be moved over the ground in the direction indicated by the arrow 138 in FIGURE 1 with the spreading member 3 rotating about the longitudinal axis of the shaft 43 and the agitator 80 rotating about the longitudinal axis of the tube 97. It will be apparent from FIGURE 5 that the speed of rotation of the shaft 88 and tube 97 is much less than the speed of rotation of the shaft 72. Upon bringing the annulus 57 and ring 65 to relative settings in which the outlet ports 58 are more or less open, powdered or granular material from the hopper 2 will be ejected from the spreading member 3 by virtue of the centrifugal force transmitted to it by rotation of the latter. The particular hole 61 or 70 which is chosen to co-operate with the pin 60 carried by the arm 59 will determine the angular settings of the outlet ports 58 about the axis of rotation of the spreading member 3 and thus the location of the strip of ground upon which the powdered or granular material will fall relative to the path of travel of the implement. In most cases, the arm 59 will be adjusted in such a way that the powdered or granular material will fall to the rear over a wide strip extending at both sides of the implement or over a strip extending substantially to one side of the implement. The quantity of material per unit time of operation or, assuming a constant speed of travel, the quantity of material per unit area of the land traversed, is controlled by adjusting the arm 67 relative to the arm 59 to bring the masking plates 66 carried by the ring 65 to appropriate settings relative to the outlet ports 58. The chosen setting is maintained by tightening the clamp 68.

The direcion of rotation of the springs 98 and the pitch 124 thereof is such that the powdered or granular material contained in the hopper is urged gently towards the outlet nozzle 42, the material being lossened and/or broken up at the same time. Since the springs 98 are movable to a substantially extent in a direction parallel to the longitudinal axis of the tube 97, the said springs take up configurations which match the resistance to their movement which is offered by the material contained in the hopper 2. This arrangement prevents the springs from exerting an excessive or dividing pressure upon the material. The variation in the pitch 124 of the springs 98 during use of the implement also varies the force which the springs exert on the material to move the material towards the outlet nozzle 42.

The agitator 80 can be removed readily from the hopper 2 by withdrawing the pin 109 against the action of the spring 112 and turning it through about 90° about its own longitudinal axis so that the eye 110 comes out of register with the slots 118 and 119. The pin 109 will then be automatically retained in a position in which its tip 115 is withdrawn from the blind hole 116 of the ring 100. As will be evident from FIGURES 7 and 8, the coupling member 101 can then be lifted off the projection 103 of the shaft 104 whilst the square plate 99, whose edges are rounded, can readily be withdrawn from the square interior 93 of the coupling member 90. The agitator 80 can then be lifted out of the hopper 2 which greatly faciliates the cleaning of both the agitator and the hopper. The use of the agitaor 80 is undesirable with certain powdered and granular materials and, when such materials are to be spread, the agitator is left out of the hopper.

The relatively large hopper 2 has a height which is approximately one-third of its length and a width which is approximately half its length, the capacity of the hopper being conveniently about 1,000 litres.

The height of the frame 1 above the ground may be changed by connecting the axle 20 to the said frame in a different manner. The strips 23 which, as can be seen in FIGURE 4, are fastened to the lowermost sides of the beams 18 and 19, can, instead, be inverted and placed on top of the strips 27 between the beams 28 and 29. Upon replacing the bolts 24, the axle 20 will be secured in a position in which it lies above the main frame beams 4 and 5 instead of below them. The frame 1 is thus displaced downwardly relative to the levels of the ground wheels 21 and 22 which is conducive, in the case of certain materials, to the efficient operation of the implement.

It will be apparent that the large size of the hopper 2 and the construction and arrangement of its supporting frame 1 provides an implement which is particularly suitable for spreading powdered or granular materials over relatively large areas since recharging of the hopper 2 with a fresh supply of material is required at much less frequent intervals than is necessary in the case of a conventional spreading implement. The construction and arrangement of the hopper supports 25 and 26 enables the hopper 2 to be mounted on, or removed from, the frame without difficulty when required.

What we claim is:

1. A container mounted on a carriage, said container comprising an oblong hopper, said hopper being V-shaped in cross section and having a downwardly extending outlet and a sloping rear side, said rear side sloping downwardly in a forward direction towards said outlet, a rim extending above said rear side, said rim sloping upwardly in a direction opposite to the slope of said rear side, said rim extending at least partly around the upper edge of said hopper, said carriage having an elongated, substantially horizontal frame member, said member having upright elements for supporting said hopper above said carriage, said elements being located adjacent and forwardly with respect to said outlet, a further supporting element on said frame member supporting the forward end of said hopper, strengthening means sustaining the long sides of said hopper, ground wheels supporting said carriage near said upright elements, said upright elements being located directly above said ground wheels whereby the weight of said hopper can be fulcrumed about the axle sustaining said ground wheels.

2. The hopper of claim 1, wherein the forward end of said hopper has a front side, said front side sloping in a direction opposite to the sloping direction of said rear side.

3. The hopper of claim 1, wherein the bottom of said hopper slopes to the rear in a direction towards said outlet and the rim extends substantially horizontal.

4. The hopper of claim 1, wherein the ground wheels are located completely below the bottom of the hopper.

5. The hopper of claim 1, wherein the hopper is releasably connected to the carriage.

6. The hopper of claim 1, wherein the strengthening means comprises a rim and said upright elements are connected to said rim.

7. The hopper of claim 1, wherein the hopper tapers from its rear side towards its front side.

8. The hopper of claim 7, wherein the hopper tapers towards its front side when seen in plan view.

References Cited

UNITED STATES PATENTS

| 2,538,886 | 1/1951 | Skibbe et al. | 275—2 |
| 2,564,255 | 8/1951 | Haydock | 275—8 |
| 2,954,235 | 9/1960 | Parker | 275—8 X |
| 3,218,023 | 11/1965 | Van der Lely et al. | 275—6 |
| 2,079,061 | 5/1937 | Zuckerman | 275—1 |
| 2,564,255 | 8/1951 | Haydock | 275—8 |
| 2,813,704 | 11/1957 | MacKissic | 259—9 |
| 3,041,076 | 6/1962 | Van der Lely et al. | 275—8 |

FOREIGN PATENTS

| 112,656 | 3/1941 | Australia. |

OTHER REFERENCES

German printed application No. 1,048,061, December 1958.

ABRAHAM G. STONE, *Primary Examiner.*

J. R. OAKS, *Assistant Examiner.*